United States Patent
Bi et al.

(10) Patent No.: US 11,706,588 B2
(45) Date of Patent: Jul. 18, 2023

(54) POSITIONING METHOD AND APPARATUS FOR UE

(71) Applicant: ZTE Corporation, Shenzhen (CN)

(72) Inventors: Cheng Bi, Shenzhen (CN); Shijun Chen, Shenzhen (CN); Dawei Chen, Shenzhen (CN); Yuanyuan Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 109 days.

(21) Appl. No.: 17/275,747

(22) PCT Filed: Sep. 11, 2019

(86) PCT No.: PCT/CN2019/105427
§ 371 (c)(1),
(2) Date: Mar. 12, 2021

(87) PCT Pub. No.: WO2020/052599
PCT Pub. Date: Mar. 19, 2020

(65) Prior Publication Data
US 2022/0038857 A1 Feb. 3, 2022

(30) Foreign Application Priority Data
Sep. 14, 2018 (CN) .......................... 201811076343.0

(51) Int. Cl.
*H04W 4/029* (2018.01)
*H04W 24/08* (2009.01)
(52) U.S. Cl.
CPC ........... *H04W 4/029* (2018.02); *H04W 24/08* (2013.01)

(58) Field of Classification Search
None
See application file for complete search history.

(56) References Cited

U.S. PATENT DOCUMENTS 11,470,570 B2 * 10/2022 Akkarakaran ...... H04W 56/001
2014/0162704 A1    6/2014 Choi
(Continued)

FOREIGN PATENT DOCUMENTS

| CN | 103856894 A | 6/2014 |
| CN | 103901399 A | 7/2014 |

(Continued)

OTHER PUBLICATIONS

3GPP, "3rd Generation Partnership Project: Technical Specification Group Radio Access Network (NG-RAN)", 3GPP TS 38.305 V1.2.0 May 31, 2018.
(Continued)

*Primary Examiner* — Adolf Dsouza
(74) *Attorney, Agent, or Firm* — Cantor Colburn LLP

(57) ABSTRACT

A positioning method for a user equipment (UE) and an associated electronic device, the method including after a UE initiates a positioning request, receiving, by the UE, first supplementary information sent by a Location Management Function (LMF), where the first supplementary information comprises Synchronization Signal Block beam polling information of a designated cell reported to the LMF by a Next Generation Radio Access Network, measuring, by the UE, the designated cell to acquire first measurement information, and determining, by the UE, a position of the UE according to the first measurement information and the first supplementary information.

20 Claims, 7 Drawing Sheets

(56) References Cited

U.S. PATENT DOCUMENTS

| | | |
|---|---|---|
| 2017/0374637 A1 | 12/2017 | Akkarakaran |
| 2018/0091947 A1 | 3/2018 | Shirakata |
| 2018/0097596 A1 | 4/2018 | Palanivelu |
| 2018/0098279 A1 | 4/2018 | Edge |
| 2018/0199160 A1 | 7/2018 | Edge |
| 2019/0394747 A1* | 12/2019 | Akkarakaran ...... H04W 56/001 |
| 2021/0149009 A1* | 5/2021 | Modarres Razavi ........................ H04W 64/003 |

FOREIGN PATENT DOCUMENTS

| | | |
|---|---|---|
| CN | 107431894 A | 12/2017 |
| CN | 108337730 A | 7/2018 |
| WO | 2016138379 A1 | 9/2016 |

OTHER PUBLICATIONS

International Search Report for corresponding application PCT/CN2019/105427 filed Sep. 11, 2019, dated Nov. 27, 2019.
3GPP TS 38.213 version 15 2.0 Release 15, ETSI TS 138 213 V15.2 0 (Jul. 2018) Physical layer procedures for control, pp. 1-101, XP014320651.
European Search Report for corresponding application 10859752.8; dated Aug. 24, 2022.

* cited by examiner

POSITIONING METHOD AND APPARATUS FOR UE

This disclosure claims priority to Chinese Patent Application No. 201811076343.0, filed with the Chinese Patent Office on Sep. 14, 2018, the disclosure of which is incorporated herein by reference in its entirety.

TECHNICAL FIELD

The present disclosure relates to the field of communications, and in particular to a positioning method and apparatus for a UE, a storage medium, and an electronic device.

BACKGROUND

The 3rd Generation Partnership Project (3GPP) has introduced support for position service since release 9, and now position services has become an important value-added service in wireless communication networks.

Cell Identity (Cell ID) and Enhanced Cell Identity (E-CID) are very important positioning methods in communication networks. The basic principle is to estimate the position of a User Equipment (UE) by using the geographical coordinates of a serving cell. E-CIDs use some additional measurement information to perform positioning, this additional measurement information usually has other functions, and is not measured just for positioning.

In order to achieve a faster data transmission rate, in the 5th generation mobile networks (5G), the millimeter wave technology is used.

Millimeter waves refer to electromagnetic waves with millimeter scale wavelengths, and the frequency of the millimeter wave is approximately between 30 GHz~300 GHz. One characteristic of the millimeter wave frequency band is severe attenuation in air, weak radiation capability, and large influence on absorption of air and rain. To overcome these factors affecting propagation, massive arrays and narrow beams are taken as an important technology for data transmission. In the related technology of the 5G standard, it has been determined that the Synchronization Signal/Physical Broadcast Channel Block (SS/PBCH Block) is sent in the manner of narrow beam polling in the millimeter wave band to achieve the synchronization function. The beam polling manner can avoid interference between Synchronization Signal Blocks (SSBs) transmitted by different cells to some extent. A positioning method based on 5G signal measurement has not been designed in the 5G standard.

SUMMARY

Embodiments of the present disclosure provide a positioning method and apparatus for a UE, so as to at least solve the problem in the related art that the location of a UE cannot be measured based on a 5G signal.

According to an embodiment of the present disclosure, a positioning method for a UE is provided, the method includes: after a UE initiates a positioning request, the UE receiving first supplementary information sent by a LMF, the first supplementary information comprises SSB beam polling information of a designated cell, and the SSB beam polling information is reported to the LMF by a NG-RAN node; the UE measures the designated cell to acquires first measurement information; the UE determines the location of the UE according to the first measurement information and the first supplementary information.

According to another embodiment of the present disclosure, another positioning method for a user equipment is provided, the method includes: a LMF receives SSB beam polling information reported by a NG-RAN node; after the NG-RAN node initiates the positioning request, the LMF obtains a second measurement information of the specified cell; the LMF determines the location of the UE according to the second measurement information and the SSB beam polling information.

According to another embodiment of the present disclosure, another positioning method for a user equipment is provided, the method includes: after a NG-RAN node initiates a positioning request, the NG-RAN node acquires a third measurement information of a serving cell from a UE; the NG-RAN node determining the location of the UE according to the information about the NG-RAN node and the third measurement information, wherein the information about the NG-RAN node comprises SSB beam polling information.

According to another embodiment of the present disclosure, a positioning apparatus for a UE is provided. The positioning apparatus is located in a UE, and the positioning apparatus comprises: a first receiving module, configured to receive, after a UE initiates a locating request, first supplementary information sent by an LMF, the first supplementary information comprises SSB beam polling information of a designated cell reported by a NG-RAN node to the LMF; a measurement module, configured to measure the specified cell and acquire first measurement information; a first positioning module, configured to determine the position of the UE according to the first measurement information and the first supplementary information.

According to another embodiment of the present disclosure, provided is another positioning device for a UE, the positioning device is located in a LMF, and positioning device includes: a second receiving module, configured to receive SSB beam polling information reported by an NG-RAN node; an acquisition module, configured to acquire a second measurement information of a specified cell after an NG-RAN node initiates a positioning request; and a second positioning module, configured to determine the location of the UE according to the second measurement information and the SSB beam-polling information.

According to another embodiment of the present disclosure, another positioning device for a UE is provided, which is located in a NG-RAN node and comprises: a third receiving module, configured to acquire a third measurement information of a serving cell from a UE after the NG-RAN node initiates a positioning request; a third positioning module, configured to determine a location of the UE according to the information of the NG-RAN node and the third measurement information, wherein the information of the NG-RAN node at least comprises SSB beam-polling information.

According to yet another embodiment of the present disclosure, a storage medium is also provided, wherein a computer program is stored in the storage medium stores, and the computer program is configured to run to execute the method mentioned in any one of the above embodiments.

According to another embodiment of the present disclosure, also provided is an electronic device, which comprises a memory and a processor, wherein a computer program is stored in the memory, and the processor is configured to run the computer program so as to execute the method mentioned in any one of the described embodiments.

DETAILED DESCRIPTION OF THE EMULSIONS

Hereinafter, the present disclosure will be described in detail with reference to the accompanying drawings and embodiments. It is important to note that the embodiments of the present disclosure and the characteristics in the embodiments can be combined under the condition of no conflicts.

It should be noted that, terms such as "first" and "second" in the specification, claims, and accompanying drawings of the present disclosure are used to distinguish similar objects, but are not necessarily used to describe a specific sequence or order.

Embodiment One

Figure 1:
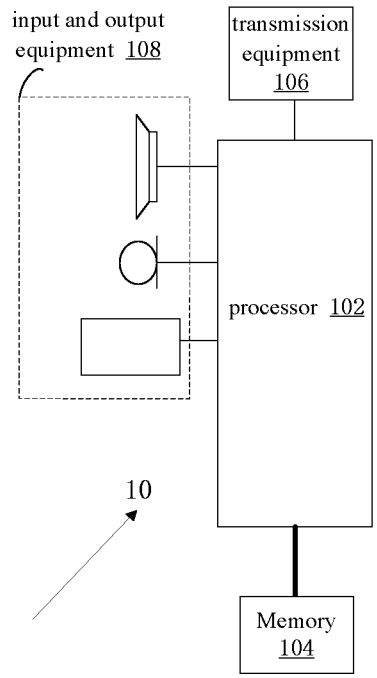
FIG. 1 is a hardware structure block diagram of a mobile terminal in a method for positioning a UE according to an embodiment of the present disclosure.

The method embodiments provided in embodiments of the present disclosure may be implemented in a mobile terminal, a computer terminal, or a similar computing apparatus. Taking a mobile terminal as an example, FIG. 1 is a hardware structure block diagram of a mobile terminal in a method for positioning a UE according to an embodiment of the present invention. As shown in FIG. 1, a mobile terminal 10 may include one or more processors (only one is shown in FIG. 1) 102 (the processors 102 may include but are not limited to processing devices such as a Microprocessor Control Unit (MCU) or a Field Programmable Gate Array (FPGA)) and a memory 104 for storing data. In an embodiment, the mobile terminal may further include a transmission device 106 for a communication function and an input/output device 108. An ordinary skilled in the art may understand that the structure shown in FIG. 1 is merely exemplary, which does not limit the structure of the foregoing mobile terminal. For example, the mobile terminal 10 may also include more or fewer components than shown in FIG. 1, or have a different configuration than that shown in FIG. 1.

The memory 104 may be configured to store a computer program, for example, a software program and a module of disclosure software, such as a computer program corresponding to the positioning method of the UE in the embodiment of the present invention. The processor 102 runs the computer program stored in the memory 104, so as to execute various function applications and data processing, that is, implement the foregoing method. Memory 104 may include high-speed random access memory, and may also include non-volatile memory, such as one or more magnetic storage devices, flash memory, or other non-volatile solid-state memory. In some instances, the memory 104 may further include memory remotely located from the processor 102, which may be connected to the mobile terminal 10 over a network. Examples of such networks include, but are not limited to, the Internet, intranets, local area networks, mobile communication networks, and combinations thereof.

The transmitting device 106 is configured to receive or transmit data via a network. Specific examples of the described network may include a wireless network provided by a communication provider of the mobile terminal 10. In one example, the transmitting device 106 may comprise a Network Interface Controller (NIC) that may be coupled to other network devices via a base station to communicate with the Internet. In one example, the transmitting device 106 can be a Radio Frequency (RF) module for communicating wirelessly with the Internet.

Figure 2:
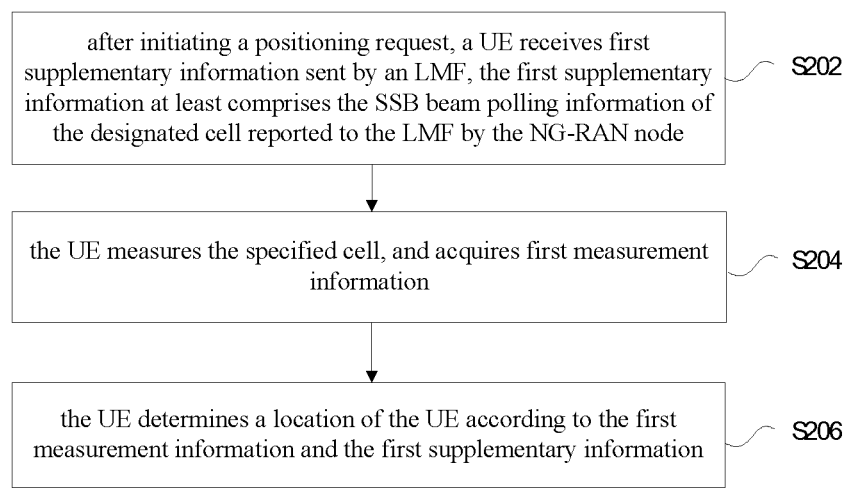
FIG. 2 is a flowchart of a method for positioning a UE according to an embodiment of the present disclosure.

The present embodiment provides a positioning method for a UE, and the method can be applied in the mobile terminal. FIG. 2 is a flowchart of a positioning method for a UE according to an embodiment of the present invention. As shown in FIG. 2, the flow comprises the following steps:

Step S202, after initiating a positioning request, a UE receives first supplementary information sent by a Location Management Function (LMF), the first supplementary information at least comprises Synchronization Signal Block (SSB) beam polling information of a designated cell, and the SSB beam polling information is reported to the LMF by The Next Generation Radio Access Network (NG-RAN) node.

Step S204, the UE measures the specified cell and acquires first measurement information.

Step S206, the UE determines the location of the UE according to the first measurement information and the first supplementary information.

By means of the present disclosure, measurement information of a cell measured by a UE and SSB beam polling information of a cell provided by an NG-RAN node can be applied to a plurality of network elements or devices in a network. Therefore, the problem in the related art that the position of the UE cannot be measured based on the 5G signal can be solved, thereby achieving the effect of implementing positioning of the device without increasing resource overhead, and also improving the positioning accuracy.

In an embodiment, the SSB beam polling information at least comprises: a sub-carrier interval and cyclic prefix configuration for sending the SSB, the number of the SSB beams, the overall SSB index of the designated cell and a coverage angle of the SSB beam in a geographic coordinate system.

In an embodiment, the NG-RAN node sends the SSB beam polling information carried in additional information of the New Radio Positioning Protocol annex (NRPPa) to the LMF.

Specifically, the SSB beam polling information may be added to the E-CID Measurement Result in the E-CID Measurement Initiation Response.

In addition, the SSB beam polling information can also be added to individually reported positioning common information. Wherein, the positioning public information at least comprises: cell geographical location information and other information.

Specifically, the LMF transmits the first supplementary information carrying the SSB beam polling information to the UE through LTE Positioning Protocol (LPP) or NR Positioning Protocol annex (NRPP) information.

In an embodiment, before the UE receives the first supplementary information sent by the LMF, the UE sends a supplementary information request message for requesting the first supplementary information to the LMF.

It should be noted that, if the UE does not request or the UE is in a "busy" state, the UE cannot actively request to obtain the first supplementary information, the LMF may send the first supplementary information to the UE by itself.

Specifically, the LMF may determine whether the request time of the UE pre-determined by the UE expires, and if so, send the first supplementary information to the UE by itself.

Specifically, the LMF may further send a query instruction to the UE, and determine, according to a query result responded by the UE, whether to send the first supplementary information to the UE.

It should be noted that, other manners capable of implementing that the LMF actively sends the first supplementary information to the UE based on the idea of this embodiment all belong to the scope of protection of this embodiment.

Alternatively, the specified cell includes at least one of the following: a serving cell where the UE is located, and an adjacent cell of the serving cell where the UE is located.

Specifically, if the UE only acquires the first measurement information corresponding to the serving cell through measurement, this embodiment mainly aims at locating the UE in the serving cell where the UE is located, that is, single cell SSB positioning. If the UE further obtains the first measurement information corresponding to the neighbor cells through measurement, the solution applied in this embodiment is directed to positioning of the UE in a plurality of cells, that is, multi-cell SSB positioning. In addition, if the UE only obtains the first measurement information corresponding to the neighbor cells through measurement, this embodiment mainly aims to locate the UE in the neighbor cells of the serving cell where the UE is located. Therefore, according to actual use requirements, the UE can respectively measure different cells by using different measurement strategies so as to acquire different first measurement information. Thus, the positioning of the UE in different cells is achieved.

In an embodiment, the first supplementary information further comprises at least one of the following: geographic coordinates of the serving cell, and geographic coordinates of the neighboring cell.

In an embodiment, when the specified cell includes the neighboring cell, the first supplementary information further includes cell identification information of the neighboring cell.

In an embodiment, the first measurement information includes one of the following: an SSB index of the specified cell, a Reference Signal Received Power (RSRP) and a Reference Signal Received Quality (RSRQ) of one or more signals in the SSB.

Specifically, the SSB index of the specified cell in the first measurement information refers to one or more of all the SSB indexes of the specified cell. For example, taking a serving cell as an example, if 8 SSB indexes exist in the serving cell, the SSB index of the specified cell in the first measurement information is one or more of the 8 SSB indexes.

In an embodiment, if the measurement result measured by the UE exceeds any one of the SSBs in the specified cell, the UE selects the one with the highest strength or the strength greater than the strength threshold from the specified cell as the SSB index of the specified cell in the first measurement information.

Specifically, the UE estimates the location of the UE according to the found SSB index of the specified cell and other information in the first supplementary information, and the overlapping range of the locations covered by the SSB beam in the geographic coordinate system.

Specifically, the UE may estimate the location of the UE more accurately by using all or some of the following: RSRP and RSRQ of a Primary Synchronization Signal (PSS), a Secondary Synchronization Signal (SSS), a Physical Broadcast Channel (PBCH), and a Demodulation Reference Signal (DMRS) of the PBCH in the SSB.

Embodiment Two

Figure 3:
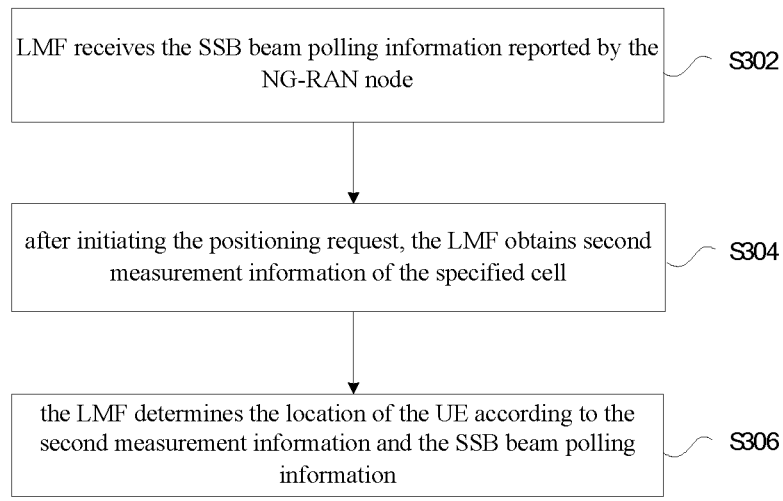
FIG. 3 is a flowchart of another method for positioning a UE according to an embodiment of the present invention.

In this embodiment, a positioning method for a UE is provided, and the method can be applied in the mobile terminal which has been described above, and the content has been mentioned will not be repeated again. FIG. 3 is a flowchart of another positioning method for a UE according to an embodiment of the present invention. As shown in FIG. 3, the flow includes the following steps:

Step S302, an LMF receives SSB beam polling information reported by an NG-RAN node;

Step S304, after initiating the positioning request, the LMF obtains second measurement information of the specified cell;

Step S306, the LMF determines the location of the UE according to the second measurement information and the SSB beam-polling information.

In an embodiment, the SSB beam polling information at least comprises: a sub-carrier interval and cyclic prefix configuration for sending the SSB, the number of the SSB beams, the overall SSB index of the designated cell and a coverage angle of the SSB beam in a geographic coordinate system. In an embodiment, the NG-RAN node sends the MSB beam polling information carried in the NRPPa information to the LMF.

Specifically, the SSB beam polling information may be added to the E-CID Measurement Result in the E-CID Measurement Initiation Response.

In addition, the SSB beam polling information can also be added to individually reported positioning common information. Wherein, the positioning public information at least comprises: cell geographical location information and other information.

Alternatively, the specified cell includes at least one of the following: a serving cell where the UE is located and an adjacent cell of the serving cell where the UE is located.

Specifically, if the UE only acquires the second measurement information corresponding to the serving cell through measurement, then this embodiment is mainly directed to locating the UE in the serving cell where the UE is located, i.e., single cell SSB positioning. If the UE further obtains the second measurement information corresponding to the neighbor cell through measurement, the solution applied in this embodiment is directed to positioning of the UE in a plurality of cells, that is, multi-cell SSB positioning. In addition, if the UE only obtains the second measurement information corresponding to the neighboring cell through measurement, this embodiment mainly aims to locate the UE in the neighboring cell of the serving cell where the UE is located. Therefore, according to actual use requirements, the UE can respectively measure different cells by using different measurement strategies so as to acquire different second measurement information. Thus, the positioning of the UE in different cells is achieved.

In an embodiment, the LMF obtains the second measurement information from the UE and/or the NG-RAN node.

In an embodiment, the LMF obtains the second measurement information in at least one of the following two manners.

Manner 1: the LMF sends second supplementary information to the UE, wherein the second supplementary information is used for the UE to perform measurement on SSBs of the serving cell and the neighboring cell; the LMF receives the second measurement information sent by the UE.

Manner 2: the UE performs a blind detection on the SSB of the neighbor cell; the LMF receives the second measurement information sent by the UE.

Specifically, when the UE performs blind detection on the SSB of the neighboring cell, the UE may carry a detection rule corresponding to the blind detection in the third supplementary information, so as to enable the LMF to identify a detection result.

Specifically, the detection rule that the UE performs the blind detection on the SSB of the neighboring cell may also be a detection rule determined through a negotiation between the LMF and the UE before the positioning.

In an embodiment, if the measurement result measured by the UE exceeds any one of the SSBs in the specified cell, the UE selects the one with the highest strength or the strength greater than the strength threshold from the specified cell as the SSB index of the specified cell in the second measurement information.

In an embodiment, the second measurement information includes one of the following: cell identification information of the specified cell, an SSB index of the specified cell, and RSRP and RSRQ of one or more signals in the SSB.

Embodiment Three

Figure 4:
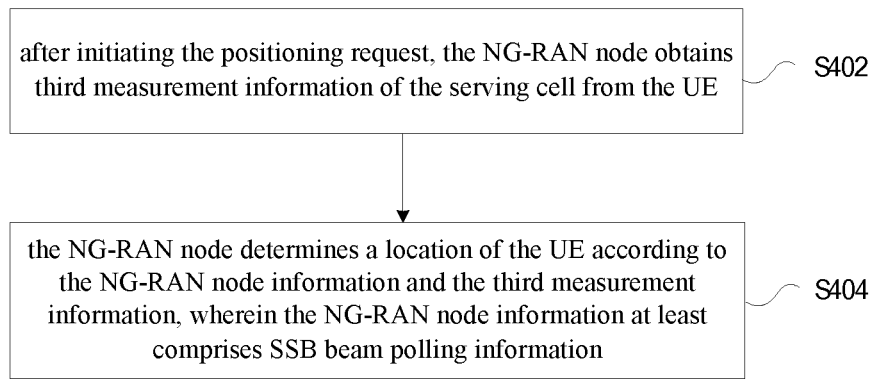
FIG. 4 is a flowchart of still another method for positioning a UE according to an embodiment of the present invention.

In this embodiment, a positioning method for a UE is provided, and the method can be applied in the mobile terminal which has been described above, and the content has been mentioned will not be repeated again. FIG. 4 is a flowchart of still another UE positioning method according to the embodiments of the present invention. As shown in FIG. 4, the flow comprises the following steps:

Step S402: after initiating the relocation request, the NG-RAN node obtains third measurement information of the serving cell from the UE.

Step S404: the NG-RAN node determines a location of the UE according to the NG-RAN node information and the third measurement information, wherein the NG-RAN node information at least includes SSB beam polling information.

In an embodiment, the SB beam polling information at least comprises: a sub-carrier interval and cyclic prefix configuration for sending the SSB, the number of the SSB beams, the overall SSB index of the designated cell and a coverage angle of the SSB beam in a geographic coordinate system.

In an embodiment, the NG-RAN node information further comprises geographical position information of the NG-RAN node.

In an embodiment, the third measurement information at least includes RSRP and RSRQ of one or more signals in the SSB.

In an embodiment, if the measurement result measured by the UE exceeds any one of the SSBs in the specified cell, the UE selects the one with the highest strength or the strength greater than the strength threshold from the specified cell as the SSB index of the specified cell in the third measurement information.

It should be noted that, if the detection result detected by the UE exceeds any one of the SSBs in the serving cell, the UE selects the SSB with the highest strength in the serving cell as the SSB corresponding to the detection result. And send the third measurement information to the LMF based on the third measurement information corresponding to the SSB.

Through the description of the foregoing embodiments, a person skilled in the art may clearly understand that the methods mentioned in the foregoing embodiments may be implemented by software in addition to a necessary universal hardware platform, and definitely may also be implemented by hardware. However, in many cases, the former is a preferred implementation. Based on such understanding, the technical solutions of the present disclosure can be embodied in the form of a software product in nature or in part contributing to the related art. The computer software product is stored in a storage medium (such as a ROM/RAM, a magnetic disk, and an optical disk), and includes a plurality of instructions for enabling a terminal device (which may be a mobile phone, a computer, a server, or a network device) to perform the method described in the embodiments of the present disclosure.

Figure 5:
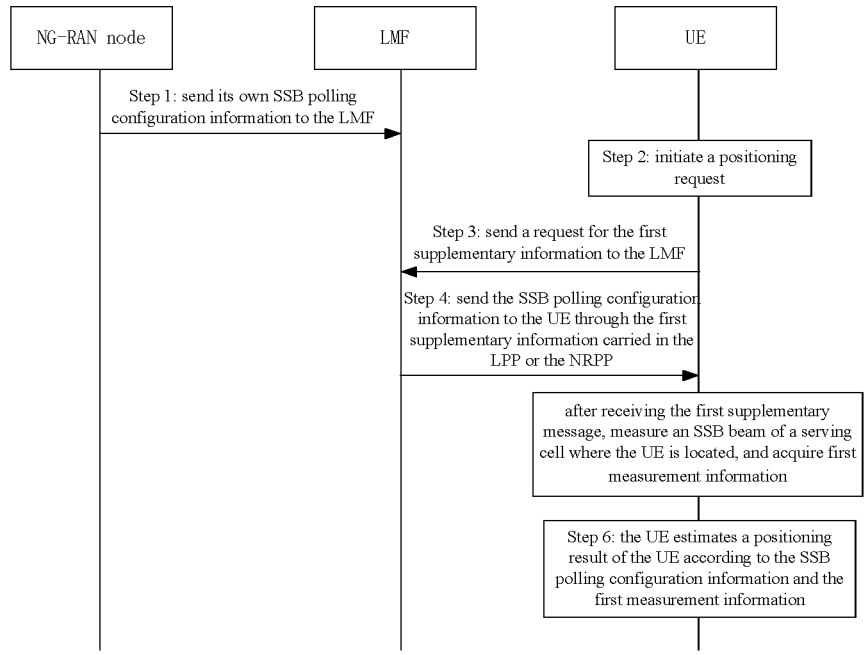
FIG. 5 is a flowchart of positioning a UE based on scenario 1 according to an embodiment of the present invention.

To better understand the solutions provided in the foregoing embodiments, the following scenario 1 is further provided to describe the foregoing embodiments in more details:

Scenario 1:

Based on a single cell, The UE is located by the UE. FIG. 5 is a flowchart of UE positioning applied to scenario 1 according to an embodiment of the present invention, as shown in FIG. 5:

Step 1: the NG-RAN node sends its own SSB polling configuration information to the LMF. Specifically, the sub-carrier interval is 120 KHz, a normal Cyclic Prefix (CP), the period of sending SSB is 5 ms, all SSB indexes are $k_1$-$k_8$, and $k_{ssb}$ SSB beams are sent Step 2: The UE initiates a positioning request.

Step 3: the UE sends a request for the first supplementary information to the LMF through an LPP or NRPP message.

Step 4: the LMF sends the SSB polling configuration information through the first supplementary information carried in the LPP or the NRPP message.

Step 5: after receiving the first assistance message, the UE measures the SSB beam of the serving cell where the UE is located, and acquires first measurement information including an SSB index being $k_3$, and the first measurement information is obtained by performed a measurement, and in the first measurement information the measured PSS receiving energy and the received quality being $RSRP_1$ and $RSRQ_1$ respectively.

Step 6: the UE estimates a positioning result of the UE according to the SSB polling configuration information and the first measurement information.

Figure 6:
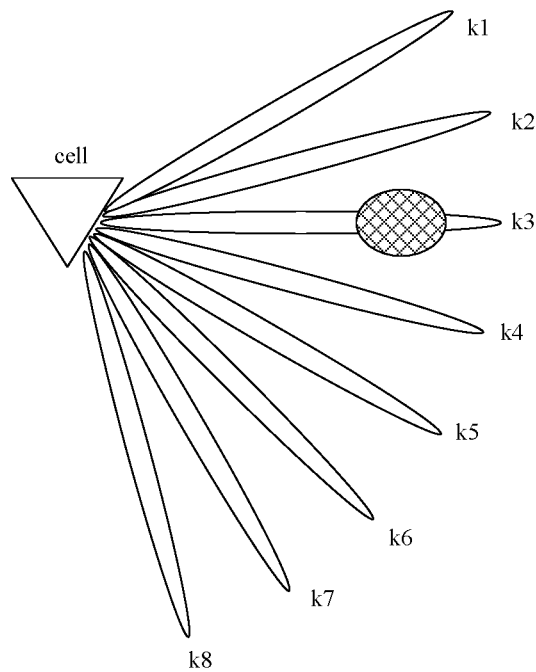
FIG. 6 is a schematic diagram of positioning a UE based on an SSB beam according to an embodiment of the present invention.

FIG. 6 is a schematic diagram of positioning a UE based on an SSB beam according to an embodiment of the present invention. According to the SSB polling configuration information, the UE determines total eight SSB beams including $k_1$-$k_8$ in the current serving cell as shown in FIG. 6. According to the SSB index in the first measurement information generated in step 4, the UE can determine that the UE is positioned in the corresponding SSB beam $k_3$. Meanwhile, according to $RSRP_1$ and $RSRQ_1$ (as shown by the circular range in FIG. 6) in the first measurement information, the UE can more accurately position the UE on the SB beam.

Figure 7:
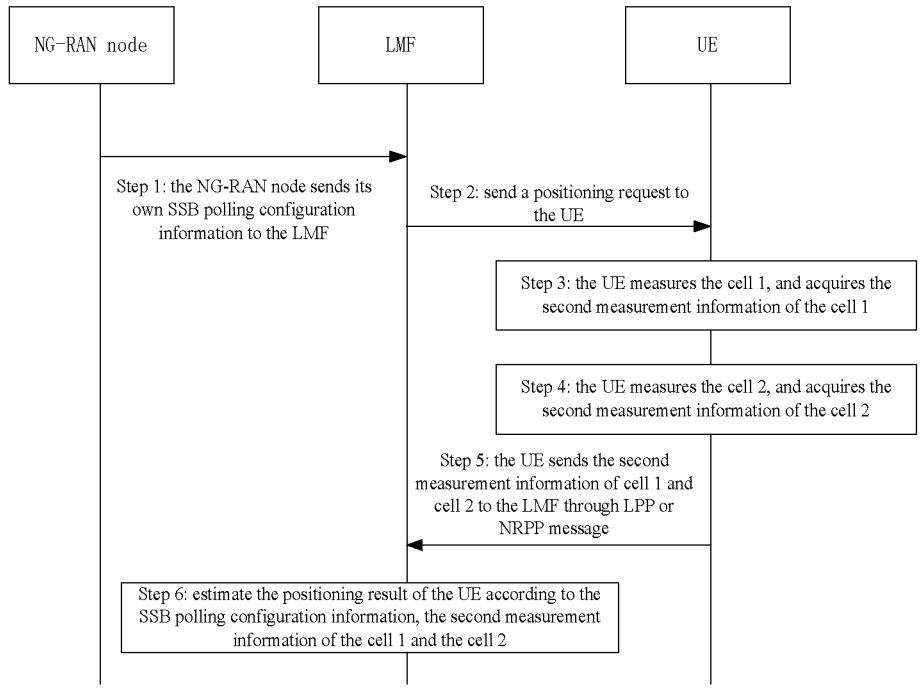
FIG. 7 is a flowchart of positioning a UE based on scenario 2 according to an embodiment of the present invention.

Scenario 2:

Based on a single cell, the UE is located by LMF. FIG. 7 is a flowchart of UE positioning applied to scenario 2 according to an embodiment of the present invention, as shown in FIG. 7:

Step 1: the NG-RAN node sends its own SSB polling configuration information to the LMF. Specifically, the sub-carrier interval is 120 KHz, a normal Cyclic Prefix (CP) is used, the sending period of the SSB is 5 ms, all the SSB indexes are $k_1$-$k_8$, and $k_{ssb}$ SSB beams are sent.

Step 2: the NG-RAN node initiates a positioning request to the UE.

Step 3: a UE measures a cell 1, and acquired second measurement information of the cell 1, and the second measurement information at least comprises: E-CID positioning with a positioning capability supporting using multi-beam SSB information; and at the time $t_1$, the UE measures an SSB beam, SSB index $k_3$, of a serving cell 1.

Step 4: the UE measures a cell 2, and acquired second measurement information of the cell 2, and the second measurement information at least comprise: E-CID positioning with the positioning capability supporting using multi-beam SSB information, and at the time $t_2$, the UE measures an SSB beam, SSB index $k_5$, of a serving cell 2.

Step 5: the UE sends the second measurement information of cell 1 and cell 2 to the LMF through an LPP or an NRPP message.

Step 6: the LMF estimates the location of the UE according to the SSB polling configuration information and the second measurement information of the cell 1 and the cell 2.

Figure 8:
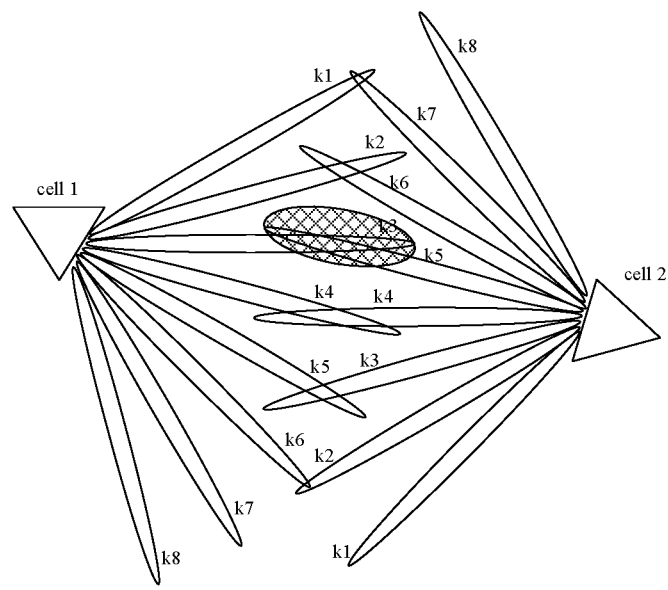
FIG. 8 is another schematic diagram of positioning a UE based on an SSB beam according to an embodiment of the present invention.

FIG. 8 is another schematic diagram of positioning a UE based on an SSB beam according to an embodiment of the present invention. According to the SSB polling configuration information, the UE determines that the current serving cells including cells 1 and 2 include eight SSB beams $k_1$-$k_8$ in total as shown in FIG. 8. Based on the SSB index $k_3$ in the second measurement information of the cell 1 generated in Step 3 and the SSB index $k_5$ in the second measurement information of the cell 2 generated in Step 4, the UE can determine that the UE is located over an intersection (a circular part in FIG. 8) of the SSB beam $k_3$ of the cell 1 and the SSB beam $k_5$ of the cell 2.

Figure 9:
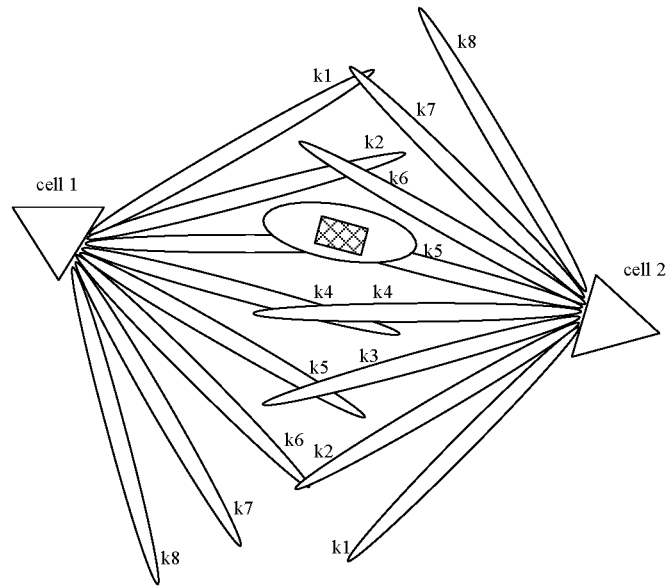
FIG. 9 is another schematic diagram of positioning a UE based on an SSB beam according to an embodiment of the present invention.

FIG. 9 is another schematic diagram of positioning a UE based on an SSB beam according to an embodiment of the present invention. According to the SSB polling configuration information, the UE determines that the current serving cells including cells 1 and 2 include eight SSB beams $k_1$-$k_8$ in total as shown in FIG. 9. If in the second measurement information of cell 1 and cell 2, the PSS reception energy and the reception quality are $RSRP_1$ and $RSRQ_1$ respectively as set in the first measurement information in scenario 1, the UE can accurately locate the UE in the SSB beams of cell 1 and cell 2 according to $RSRP_1$ and $RSRQ_1$ (rectangular parts in FIG. 9).

Figure 10:
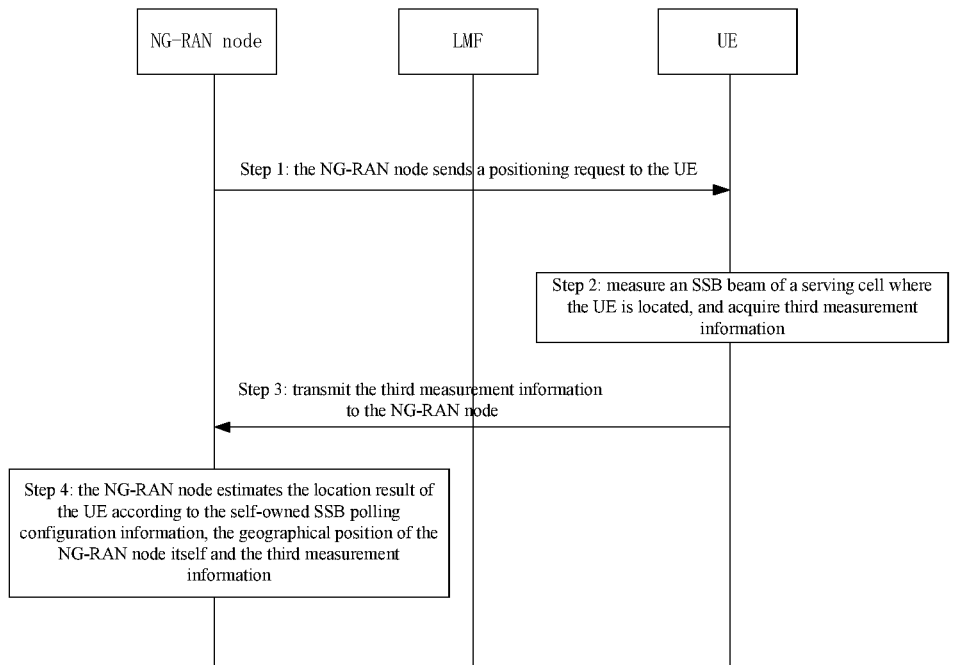
FIG. 10 is a flowchart of positioning a UE based on scenario 3 according to an embodiment of the present disclosure.

Scenario 3:

The UE is located through the NG-RAN node based on a single cell. FIG. 10 is a flowchart of UE positioning applied to scenario 3 according to an embodiment of the present invention, as shown in FIG. 10:

Step 1: The NG-RAN node initiates a positioning request to the UE.

Step 2: The UE measures an SSB beam of a serving cell where the UE is located, and acquires third measurement information including an SSB index of $k_3$, and the measured PSS reception energy and reception quality are $RSRP_1$ and $RSRQ_1$ respectively.

Step 3: the UE sends to the NG-RAN node, via the preamble, third measurement information carrying an SSB index of $k_3$, and the measured PSS receiving energy and received quality are $RSRP_1$ and $RSRQ_1$ respectively.

Step 4: the NG-RAN node estimates the positioning result of the UE according to its own SSB polling configuration information (namely, the sub-carrier interval is 120 KHz, a normal CP, a SSB sending period is 5 ms, all the SSB indexes $k_1$-$k_8$ of the designated cell are sent, and $k_{ssb}$ SSB beams are sent), the geographical position of the NG-RAN node and the third measurement information.

It should be noted that the foregoing embodiments are merely examples, and any reasonable change or other form of example based on the idea of the foregoing embodiments belongs to the scope of protection of this embodiment.

Embodiment Four

Also provided in the present embodiment is a positioning apparatus for a UE. The apparatus is used for implementing the described embodiments and optional implementations, and what has been described will not be elaborated. The term "module", as used hereinafter, is a combination of software and/or hardware capable of realizing a predetermined function. Although the apparatus described in the following embodiment is preferably implemented by software, implementation of hardware or a combination of software and hardware is also possible and conceived.

Figure 11:
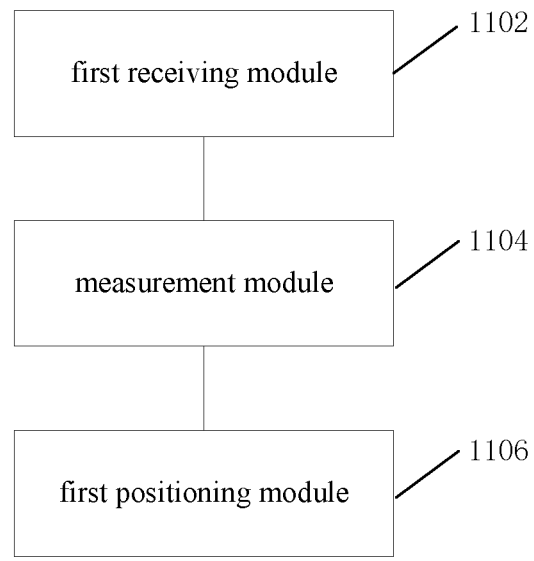
FIG. 11 is a structural block diagram of a positioning apparatus for a UE according to an embodiment of the present invention.

FIG. 11 is a structural block diagram of a positioning apparatus for a UE according to an embodiment of the present invention. As shown in FIG. 11, the apparatus includes a first receiving module 1102, a measuring module 1104, and a first positioning module 1106.

A first receiving module 1102, configured to receive, after initiating a positioning request, first supplementary information sent by the LMF; the first supplementary information at least comprises SSB beam polling information of a designated cell reported to the LMF by a NG-RAN node;

A measurement module 1104, configured to measure the specified cell and obtain first measurement information;

A first positioning module 1106, configured to determine the location of the UE according to the first measurement information and the first supplementary information.

It should be noted that the plurality of modules may be implemented through software or hardware. The latter may be implemented in the following manner, but is not limited thereto. All the modules are located in the same processor;

or, the modules are located in different processors respectively in the form of any combination.

Embodiment Five

The present embodiment further provides another positioning apparatus for a UE. The apparatus is configured to implement the foregoing embodiments and optional implementations, and what has been described is not repeated herein. The term "module", as used hereinafter, is a combination of software and/or hardware capable of realizing a predetermined function. Although the apparatus described in the following embodiment is preferably implemented by software, implementation of hardware or a combination of software and hardware is also possible and conceived.

Figure 12:
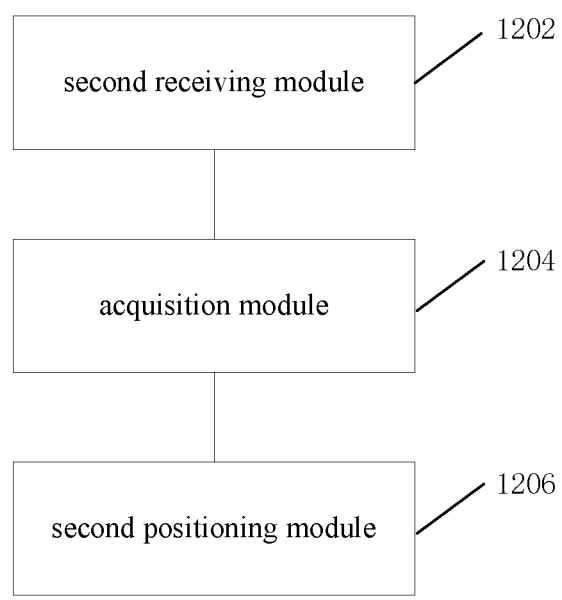
FIG. 12 is a structural block diagram of another device for positioning a UE according to an embodiment of the present invention.

FIG. 12 is a structural block diagram of another positioning apparatus for a UE according to an embodiment of the present invention. As shown in FIG. 12, the apparatus includes a second receiving module 1202, an acquisition module 1204 and a second positioning module 1206.

A second receiving module 1202 configured to receive the SSB beam polling information reported by the NG-RAN node;

A acquisition module 1204 is configured to acquire a second measurement information of the specified cell after the positioning request is initiated;

The second location module 1206 is configured to determine a location of the UE according to the second measurement information and the SSB beam-polling information.

It should be noted that the plurality of modules may be implemented through software or hardware. The latter may be implemented in the following manner, but is not limited thereto. All the modules are located in the same processor; or, the modules are located in different processors respectively in the form of any combination.

Embodiment Six

The present embodiment further provides another positioning apparatus for a UE. The apparatus is configured to implement the foregoing embodiments and optional implementations, and what has been described is not repeated herein. The term "module", as used hereinafter, is a combination of software and/or hardware capable of realizing a predetermined function. Although the apparatus described in the following embodiment is preferably implemented by software, implementation of hardware or a combination of software and hardware is also possible and conceived.

Figure 13:
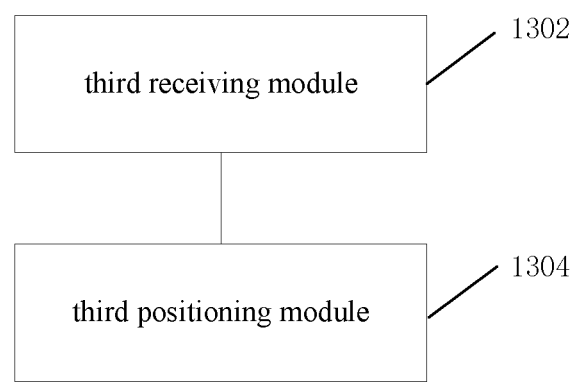
FIG. 13 is a structural block diagram of still another device for positioning a UE according to an embodiment of the present invention.

FIG. 13 is a structural block diagram of still another positioning apparatus for a user equipment UE according to an embodiment of the present invention. As shown in FIG. 13, the apparatus includes a third receiving module 1302 and a third positioning module 1304.

A third receiving module 1302, configured to obtain third measurement information of a serving cell from a UE after a positioning request is initiated;

A third positioning module 1304, configured to determine a location of the UE according to the NG-RAN node information and the third measurement information, where the NG-RAN node information at least includes: SSB beam-polling information.

It should be noted that the plurality of modules may be implemented through software or hardware. The latter may be implemented in the following manner, but is not limited thereto. All the modules are located in the same processor; or, the modules are located in different processors respectively in the form of any combination.

Embodiment Seven

Embodiments of the present disclosure further provide a storage medium. The storage medium stores a computer program. The computer program is configured to execute the steps in any one of the method embodiments when running.

In an embodiment, in this embodiment, the storage medium may be configured to store a computer program for executing the following steps:

S1, after an initiated positioning request, a UE receiving first supplementary information sent by an LMF; wherein, the first supplementary information at least comprises: the SSB beam polling information of the designated cell reported by the NG-RAN node to the LMF.

S2, the UE measures the designated cell, and acquires first measurement information.

S3, according to the first measurement information and the first supplementary information, the UE determines the position of the UE.

Or,

S1, an LMF receives SSB beam polling information reported by an NG-RAN node.

S2, after initiating the positioning request, the LMF obtains second measurement information of the specified cell.

S3, according to the second measurement information and the SSB beam polling information, the LMF determines the position of the UE.

Or,

S1, after initiating the positioning request, the NG-RAN node obtains a third measurement information of the serving cell from the UE.

S2, the NG-RAN node determining the location of the UE according to the NG-RAN node information and the third measurement information, wherein the NG-RAN node information at least comprises: SSB beam-polling information.

In an embodiment, in this embodiment, the storage medium may include a plurality of media capable of storing a computer program, such as a Universal Serial Bus flash disk (USB disk), a Read-Only Memory (ROM), a Random Access Memory (RAM), a mobile hard disk, a magnetic disk, or an optical disk.

Embodiments of the present disclosure further provide an electronic apparatus, comprising a memory and a processor. The memory stores a computer program. The processor is configured to run the computer program to execute steps in any one of the method embodiments.

In an embodiment, the electronic apparatus can further comprise a transmission device and an input/output device, wherein the transmission device is connected to the processor, and the input/output device is connected to the processor.

In an embodiment, in this embodiment, the processor may be arranged to execute the following steps by means of a computer program:

S1, after an initiated positioning request, a UE receiving first supplementary information sent by an LMF; wherein, the first supplementary information at least comprises: the SSB beam polling information of the designated cell reported by the NG-RAN node to the LMF.

S2, the UE measures the designated cell, and acquires first measurement information.

S3, according to the first measurement information and the first supplementary information, the UE determines the position of the UE.

Or,

S1, an LMF receives SSB beam polling information reported by an NG-RAN node.

S2, after initiating the positioning request, the LMF obtains second measurement information of the specified cell.

S3, according to the second measurement information and the SSB beam polling information, the LMF determines the position of the UE.

Or,

S1, after initiating the positioning request, the NG-RAN node obtains third measurement information of the serving cell from the UE.

S2, the NG-RAN node determining the location of the UE according to the NG-RAN node information and the third measurement information, wherein the NG-RAN node information at least comprises: SSB beam-polling information.

Alternatively, for specific examples in this embodiment, reference may be made to the examples described in the foregoing embodiments and optional implementations, and details are not repeatedly described herein in this embodiment.

Obviously, those skilled in the art should understand that the described modules or steps of the present disclosure can be realized by a common computing device, which can be concentrated on a single computing device or distributed on a network composed of a plurality of computing devices. Optionally, they may be implemented by program code executable by a computing device, and thus, they may be stored in a storage device and executed by the computing device, and in some cases, the steps shown or described may be performed in an order different from that here, or they may be manufactured into one or more integrated circuit modules, or a plurality of modules or steps thereof may be manufactured into a single integrated circuit module. As such, the disclosure is not limited to a specific combination of hardware and software.

What is claimed is:

1. A positioning method for a User Equipment (UE), comprising:
   after a UE initiates a positioning request, receiving, by the UE, first supplementary information sent by a Location Management Function (LMF), wherein the first supplementary information comprises Synchronization Signal Block (SSB) beam polling information of a designated cell reported to the LMF by a Next Generation Radio Access Network (NG-RAN node);
   measuring, by the UE, the designated cell to acquire first measurement information; and
   determining, by the UE, a position of the UE according to the first measurement information and the first supplementary information.

2. The method according to claim 1, before receiving, by the UE, the first supplementary information sent by the LMF, further comprising:
   sending, by the UE, a supplementary information request message used for requesting the first supplementary information to the LMF.

3. The method according to claim 1, wherein the designated cell comprises at least one of the following: a serving cell where the UE is located, a neighbor cell of a serving cell where the UE is located.

4. The method according to claim 3, wherein the first supplementary information further comprises at least one of the following: geographic coordinates of the serving cell, geographic coordinates of the neighboring cell.

5. The method according to claim 3, wherein, in a case that the specified cell comprises the neighboring cell, the first supplementary information further comprises cell identification information of the neighboring cell.

6. The method according to claim 1, wherein the SSB beam polling information comprises:
   a sub-carrier interval and cyclic prefix configuration for sending the SSB, a number of the SSB beams, all SSB indexes of the designated cell, and a coverage angle of the SSB beams in a geographic coordinate system.

7. The method according to claim 1, wherein the first measurement information comprises one of the following:
   an SSB index of the specified cell, reference signal received power (RSRP) and reference signal received quality (RSRQ) of one or more signals in the SSB.

8. An electronic device, comprising a memory and a processor, wherein a computer program is stored in the memory, and the processor is configured to run the computer program so as to execute the method as claimed claim 1.

9. A positioning method for a User Equipment (UE), comprising:
   receiving, by a Location Management Function (LMF), Synchronization Signal Block (SSB) beam polling information reported by a Next Generation Radio Access Network (NG-RAN) node;
   after the NG-RAN node initiates the positioning request, obtaining, by the LMF, a measurement information of the specified cell; and
   determining, by the LMF, the location of the UE according to the measurement information and the SSB beam-polling information.

10. The method according to claim 9, wherein the LMF obtains the measurement information from at least one of the following: the UE, the NG-RAN node.

11. The method according to claim 10, wherein the designated cell comprises at least one of the following: a serving cell where the UE is located; a neighbor cell of a serving cell where the UE is located.

12. The method according to claim 11, wherein acquiring, by the LMF, the measurement information from the UE comprises:
   sending, by the LMF, supplementary information to the UE, wherein the supplementary information is used for the UE to measure SSBs of the serving cell and SSBs of the neighbor cell;
   receiving, by the LMF, the measurement information sent by the UE.

13. The method according to claim 11, wherein the acquiring, by the LMF, the measurement information from the UE comprises:
   receiving, by the LMF, the measurement information sent by the UE, wherein the measurement information is determined by blind detection performed by the UE on the SSBs of the neighboring cells.

14. The method according to claim 9, wherein the measurement information comprises one of the following:
   cell identification information of the designated cell, an SSB index of the designated cell, RSRP and RSRQ of one or more signals in the SSB.

15. The method according to claim 9, wherein the SSB beam polling information comprises:
   a sub-carrier interval and cyclic prefix configuration for sending the SSB; the number of the SSB beams; all the SSB indexes of the designated cell; and a coverage angle of the SSB beams in a geographic coordinate system.

16. An electronic device, comprising a memory and a processor, wherein a computer program is stored in the memory, and the processor is configured to run the computer program so as to execute the method as claimed in claim 9.

17. A positioning method for a User Equipment (UE), comprising:

after a Next Generation Radio Access Network (NG-RAN) node initiates a positioning request, acquiring, by the NG-RAN node, a measurement information of a serving cell from a UE;

determining, by the NG-RAN node, the location of the UE according to information about the NG-RAN node and the measurement information, wherein the information about the NG-RAN node comprises SSB beam polling information.

18. The method according to claim 17, wherein the measurement information comprise RSRP and RSRQ of one or more signals in the SSB.

19. The method according to claim 17, wherein the information about the NG-RAN node further comprises geographical location information of the NG-RAN node.

20. The method according to claim 17, wherein the SSB beam polling information comprises at least one of the following: a sub-carrier interval and cyclic prefix configuration for sending the SSB, a number of the SSB beams, all SSB indexes of the designated cell, and a coverage angle of the SSB beam in a geographic coordinate system.

* * * * *